US009924367B2

(12) United States Patent
Kapnadak et al.

(10) Patent No.: US 9,924,367 B2
(45) Date of Patent: *Mar. 20, 2018

(54) METHOD AND APPARATUS FOR MAXIMIZING NETWORK CAPACITY OF CELL SITES IN A WIRELESS NETWORK

(71) Applicant: AT&T Intellectual Property I, L.P., Atlanta, GA (US)

(72) Inventors: Vibhav Kapnadak, Milpitas, CA (US); Zhi Li, San Ramon, CA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/395,788

(22) Filed: Dec. 30, 2016

(65) Prior Publication Data

US 2017/0111800 A1 Apr. 20, 2017

Related U.S. Application Data

(63) Continuation of application No. 14/086,931, filed on Nov. 21, 2013, now Pat. No. 9,565,577.

(51) Int. Cl.
*H04W 16/10* (2009.01)
*H04W 24/02* (2009.01)
(Continued)

(52) U.S. Cl.
CPC .......... *H04W 16/10* (2013.01); *H04B 17/382* (2015.01); *H04L 43/16* (2013.01); *H04W 24/02* (2013.01); *H04W 72/0453* (2013.01)

(58) Field of Classification Search
CPC ... H04W 16/24; H04W 24/02; H04W 52/346; H04W 16/10; H04W 16/18; H04W 52/367
(Continued)

(56) References Cited

U.S. PATENT DOCUMENTS 5,649,292 A 7/1997 Doner
6,023,459 A 2/2000 Clark
(Continued)

OTHER PUBLICATIONS

Paull, Volker, Juan Diego Naranjo, and Elko Seidel. "Heterogeneous lte networks and inter-cell interference coordination." Nomor Research GmbH, Munich, Germany Dec. (2010). http://lteportal.com/Files/MarketSpace/Download/447_1-14nomor.pdf.
(Continued)

*Primary Examiner* — Cong Tran

(57) ABSTRACT

A method, computer-readable storage device and an apparatus for maximizing the capacity of a wireless network across a geographical area are disclosed. For example, the method monitors the wireless network and gathering network information and user endpoint device information for a geographical area comprising a plurality of cells of the wireless network, processes, for each cell, the network information and the user endpoint device information that is gathered and generating a cell specific traffic pattern, determines whether the capacity is below a threshold, and increases the capacity of the geographical area in accordance with the network information and the user endpoint device information that is processed for each cell, and the cell specific traffic pattern that is generated for each cell, when the capacity is below the threshold.

20 Claims, 3 Drawing Sheets

(51) Int. Cl.
*H04L 12/26* (2006.01)
*H04B 17/382* (2015.01)
*H04W 72/04* (2009.01)

(58) Field of Classification Search
USPC ............ 455/446, 467, 450, 422.1, 424, 453, 455/456.1
See application file for complete search history.

(56) References Cited

U.S. PATENT DOCUMENTS

| | | | |
|---|---|---|---|
| 6,262,980 | B1 | 7/2001 | Leung et al. |
| 6,347,224 | B1 | 2/2002 | Smyth et al. |
| 6,408,185 | B1 | 6/2002 | Freeman et al. |
| 7,146,132 | B2 | 12/2006 | Keller et al. |
| 7,636,334 | B2 | 12/2009 | Gerlach |
| 7,680,475 | B2 | 3/2010 | Ji et al. |
| 7,890,098 | B2 | 2/2011 | Karabinis |
| 8,059,589 | B2 | 11/2011 | Ji et al. |
| 8,060,017 | B2 | 11/2011 | Schlicht et al. |
| 8,259,601 | B2 | 9/2012 | Fu |
| 8,400,937 | B2 | 3/2013 | Huang et al. |
| 8,411,624 | B2 | 4/2013 | Stolyar et al. |
| 8,478,190 | B2 | 7/2013 | Sayana et al. |
| 8,504,041 | B2 | 8/2013 | Stephens |
| 8,509,177 | B2 | 8/2013 | Goldhamer |
| 8,521,173 | B2 | 8/2013 | Zhang et al. |
| 8,559,961 | B2 | 10/2013 | Boudreau et al. |
| 2001/0012280 | A1 | 8/2001 | Dent |
| 2010/0069074 | A1 | 3/2010 | Kodialam |
| 2010/0142421 | A1 | 7/2010 | Schlicht et al. |
| 2010/0173637 | A1 | 7/2010 | Damnjanovic et al. |
| 2011/0205929 | A1 | 8/2011 | Quek et al. |
| 2011/0249642 | A1 | 10/2011 | Song et al. |
| 2012/0020307 | A1* | 1/2012 | Henderson ............ H04W 28/16 370/329 |
| 2012/0106428 | A1 | 5/2012 | Schlicht et al. |
| 2012/0149431 | A1 | 6/2012 | Bakker |
| 2012/0190359 | A1 | 7/2012 | Aminaka |
| 2012/0207037 | A1 | 8/2012 | Balachandran et al. |
| 2013/0044697 | A1 | 2/2013 | Yoo et al. |
| 2013/0065599 | A1 | 3/2013 | Chan et al. |
| 2013/0114525 | A1 | 5/2013 | Ahmadi |
| 2014/0098694 | A1 | 4/2014 | Damji |

OTHER PUBLICATIONS

Fodor, Gabor, et al. "Intercell interference coordination in OFDMA networks and in the 3GPP long term evolution system." Journal of Communications 4.7 (2009): 445-453. http://www.ojs.academypublisher.com/index.php/jcm/article/viewFile/0407445453/14.

* cited by examiner

METHOD AND APPARATUS FOR MAXIMIZING NETWORK CAPACITY OF CELL SITES IN A WIRELESS NETWORK

This application is a continuation of U.S. patent application Ser. No. 14/086,931, filed Nov. 21, 2013, which is currently pending and is herein incorporated by reference in its entirety.

BACKGROUND

A customer's ability to access wireless services that are provided by a network service provider, e.g., a wireless service provider, is dependent on availability of capacity in the network. For example, the wireless service provider needs to provide cellular coverage by deploying various network elements, e.g., base station subsystems, cell site equipment, and so on.

In order to provide improved cellular coverage and performance, the wireless service provider may deploy a large number of cells. However, frequencies are assigned to users in a static manner. For example, carrier components are assigned for each user device and are kept the same way, regardless of variations in network traffic patterns. In addition, the assignment of carrier components is performed based on knowledge of a network status in the vicinity of the particular cell.

SUMMARY OF THE DISCLOSURE

In one embodiment, the present disclosure describes a method, computer-readable storage device and an apparatus for maximizing the capacity of a wireless network across a geographical area. For example, the method monitors the wireless network and gathering network information and user endpoint device information for a geographical area comprising a plurality of cells of the wireless network, processes, for each cell, the network information and the user endpoint device information that is gathered and generating a cell specific traffic pattern, determines whether the capacity is below a threshold, and increases the capacity of the geographical area in accordance with the network information and the user endpoint device information that is processed for each cell, and the cell specific traffic pattern that is generated for each cell, when the capacity is below the threshold.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly describes a method, computer-readable storage device, and apparatus for maximizing the capacity of a wireless network across a geographical area. Although the teachings of the present disclosure are discussed below in the context of a long term evolution (LTE) based wireless network, the teaching is not so limited. Namely, the teachings of the present disclosure can be applied for other types of wireless networks, where a user device may communicate with the wireless network on a plurality of frequencies.

Broadly defined, 3GPP is a global effort to define a wireless communication system specification. 2G is a second generation cellular network technology, 3G is a third generation cellular network technology, and 4G is a fourth generation cellular network technology. A Global System for Mobile (GSM) communications is an example of a 2G cellular technology and a Universal Mobile Telecommunications System (UMTS) is an example of a 3G cellular network technology. In accordance to the 3GPP global effort, a General Packet Radio Service (GPRS) refers to a communications service used to transfer data via a cellular network. GPRS is available to users of a 2G cellular system GSM. The GPRS provides an enhancement to the GSM system so that data packets are supported. In addition, in 3GPP release 8, an LTE is provided as a set of enhancements to the UMTS. The enhancement focuses on adopting 4th Generation (4G) mobile communications technology to include an all Internet Protocol (IP) end-to-end networking architecture. An LTE is an example of a 4G cellular network technology.

For the 4G network, a radio base transceiver station (RBS), as per the 3GPP standards, is referred to as an eNodeB (or simply as a base station). The eNodeB provides an LTE—air interface and performs radio resource management for wireless access. Users of LTE networks may communicate with base stations (eNodeBs) via a plurality of frequencies.

Figure 1:
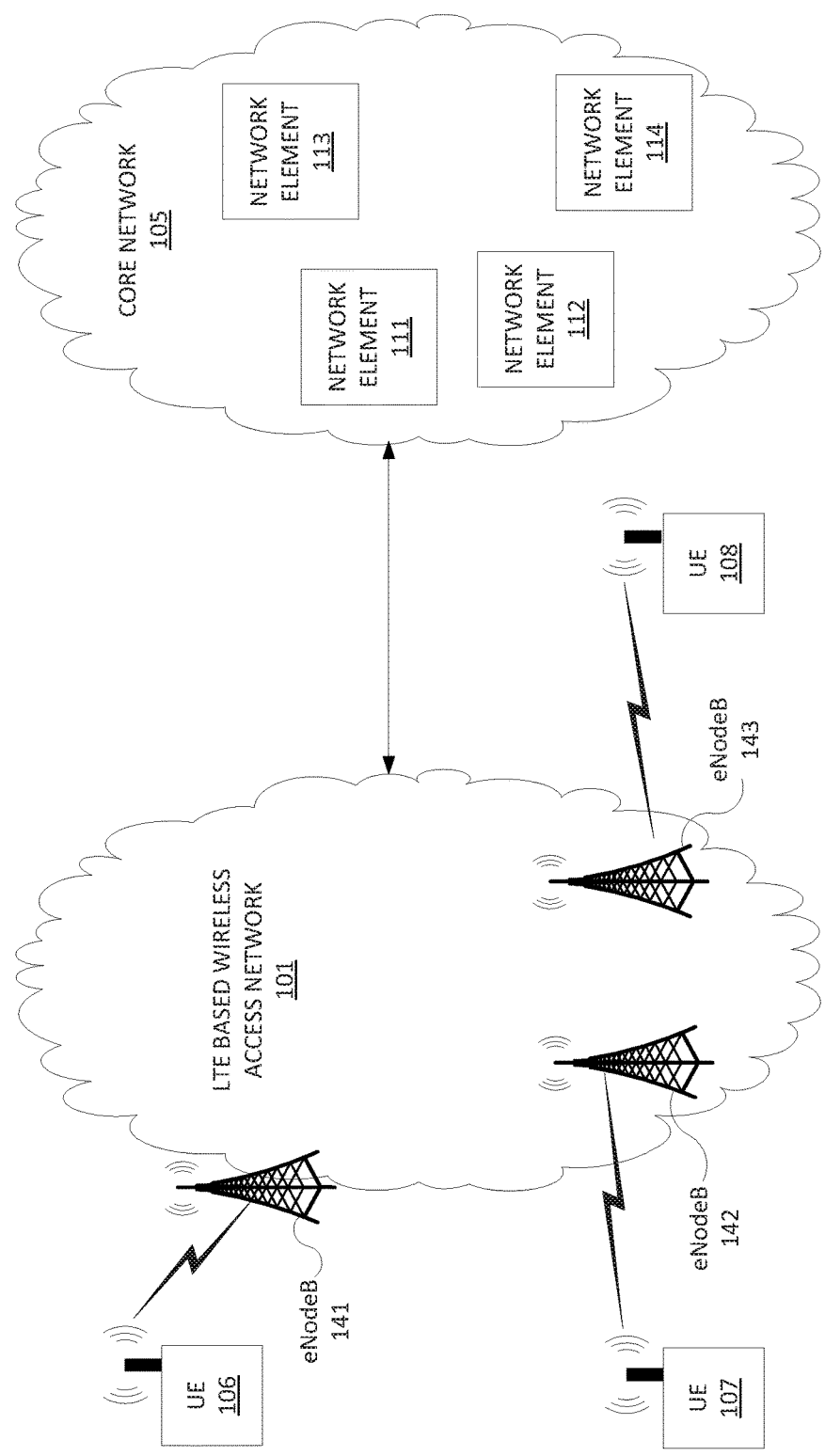
FIG. 1 illustrates an exemplary network related to the present disclosure.

FIG. 1 illustrates an exemplary network 100 related to the present disclosure. In one illustrative embodiment, the network 100 comprises an LTE technology based wireless access network 101, a core network 105 and user endpoint devices 106-108. The wireless access network 101 comprises the eNodeBs 141-143.

The user endpoint devices 106-108 can be a smart phone, a cellular phone, a computer or laptop, a computing tablet, or any endpoint communication devices equipped with wireless capabilities. The user endpoint devices 106-108 may access services via the access network 101.

The core network 105 comprises various network elements 111-114 and provides various functions that support wireless services. For example, user data packets may originate at a user endpoint, traverse an access network 101, traverse the core network, and may be forwarded towards a destination via another access network (not shown). In addition to routing and forwarding user data packets, network elements 111-114 in the core network 105 may act as, mobility anchors for the user plane during handovers, and as anchors for mobility among various wireless technologies. It should be noted that the access network 101 and core network 105 are simplified without showing various network elements that are deployed in these networks.

In one embodiment, network elements in the core network may also be responsible for UE (User Equipment) tracking and paging (e.g., such as retransmissions), bearer activation and deactivation process, selection of a serving gateway, authentication of a user, providing information about the subscriber's location, supporting accesses to subscriber databases and specialized functions of a charging system, providing public data gateways, providing subscription related information (profiles), etc.

In order to provide improved cellular coverage, the wireless service provider may deploy a large number of cell sites. In turn, the wireless service provider is tasked with having to manage an ever increasing number of cell sites. Each cell site has access to a set of frequencies which may be assigned to users. The number of users the network can support depends on the efficient usage of the frequency spectrum available for each cell. For example, a cell may use frequencies in one or more of: 824-896 Mhz range and 1850-1990 Mhz ranges. The frequency ranges may also be referred to as the 800 Mhz band or the 1900 Mhz band, respectively. These frequency ranges are only illustrative and should not be viewed as limiting the present disclosure. In other words, if additional frequencies are deployed, the embodiments of this disclosure are equally applicable to those additional frequencies.

A large number of frequencies may be allocated to the wireless service provider within a band of frequencies. Each band comprises a number of channels. A channel refers to a resource that may be assigned to a user within a cell. For example, a frequency channel used in one cell may be reused in another cell. However, as the reuse of frequency channels increases, interference increases. In an LTE network, there may be two types of interferences: intra-cell and inter-cell interferences. Intra-cell interference refers to interference between two frequency channels used within a same cell. For example, the two frequency channels may be close together, in-terms of spectral location, and power associated with one frequency channel may affect the power associated with another frequency channel. Inter-cell interference refers to interference caused by a same frequency channel being used by a plurality of adjacent cells.

One approach to reduce inter-cell interference is by using an inter-cell interference coordination (ICIC) technique that provides frequency reuse factors, transmit power levels, and frequency assignments for the cells, in a static manner. The frequency reuse factor is a number that restricts how often a frequency may be reused by a plurality of cells. For example, a frequency reuse factor of 1 would enable the frequency to be reused by adjacent cells. In another example, a frequency reuse factor of 2 would enable the frequency to be reused by every other cell, i.e., reuse is restricted to non-adjacent cells. The transmit power level for each frequency is allocated such that the power transmitted by an eNodeB does not exceed a maximum power level. However, the frequencies are allocated in a static manner, regardless of the network traffic which is dynamic in nature. In real networks, the network traffic load, traffic patterns, and types of applications accessed by users may change over time. In addition, the service provider may deploy multiple carrier frequency components (e.g., one or more components in the 800 Mhz range and one or more components in the 1900 Mhz range). Since the ICIC performs the frequency assignments in a static manner, an optimality of the assignment appears to be possible during a planning phase of the frequency resources. However, the optimality is lost soon after actual network traffic begins traversing the network.

Another approach to reduce inter-cell interference is via a dynamic ICIC technique that changes the frequency reuse factor in a distributed manner. The dynamic ICIC technique changes the frequency reuse factor by enabling the eNodeBs to exchange network state information via a link on an X2 interface. For example, the eNodeBs may need to exchange network load information, interference information, etc. For instance, one eNodeB may request that another eNodeB reduce or eliminate usage of a certain frequency, may request that another eNodeB restrict which users are able to use certain frequencies, etc. However, this approach has several drawbacks.

First, each eNodeB has a limited number of X2 links that the eNodeB can support. The limit on the number of X2 links that can be supported may imply that the approach is not useful for large scale or dense networks with 100s of cell sites. There may also be substantial delay for exchanging the information over X2 links. Thus, the exchanging of information may be restricted to an exchange among a cluster of a few cells and the frequency assignment would then only be based on knowledge among the small cluster of cells.

Second, since the information is exchanged only within a cluster of cells, interference from overshooting cells may not be captured. The service provider may be interested in maximizing the frequency reuse factor across an entire geographical area that comprises several clusters of cells. However, the method does not provide a global view to enable maximizing the frequency reuse factor across the entire geographical area.

Third, the dynamic ICIC technique seeks to provide only to optimize the frequency reuse factors. However, the operating frequencies for each cell remain unchanged even when the frequency reuse factors may be dynamically changed.

In one embodiment, the present disclosure provides a method for maximizing the capacity of a wireless network across a geographical area by reducing the inter-cell interference via a hybrid ICIC technique. The user endpoint devices of the present method access services by communicating with the wireless network via a plurality of carrier frequency components. The hybrid ICIC technique maximizes the capacity of the wireless network across the geographical area by providing: optimal operating frequencies, optimal frequency reuse factors, optimal values of transmit power levels, and optimal assignments of carrier frequency components to the user endpoint devices.

The hybrid ICIC technique maximizes the network capacity of cell sites by coordinating frequency assignments based on a view of the entire geographical area that is selected for optimization. For example, instead of assigning a frequency to a user endpoint device based on knowledge of the network status in the vicinity of one particular cell in which the particular user endpoint device is located, the present method assigns the frequency based on knowledge of the network status of the selected geographical area having a plurality of cells. In one embodiment, the geographic area comprises a plurality of cells, e.g., 2 cells, 3 cells, 4 cells, or a range of cells, e.g., greater than 5 cells and the like. The knowledge of the network status of the geographical area provides a more global view. The total capacity of the network that comprises multiple cells is then maximized by coordinating how frequencies are used and reused across the multiple cells. For example, the coordination may provide optimally assignments of frequencies, optimal reuse factors, optimal transmit powers, and/or optimal assignments of carrier components for each user endpoint device of each cell of the plurality of cells in the geographical area.

The method first gathers network information and user endpoint device information for geographical area. For example, the method monitors the wireless network and, for each UE in the geographical area, the method gathers user endpoint device information that comprises one or more of: location information, Channel State Information (CSI), Channel Quality Information (CQI), and application information. For example, the application information may provide the type of application accessed by the UE. For example, the type of application may be a voice application, a data application, a streaming application (e.g., video), or a gaming application. The location information refers to the physical location of the UE. For example, the location information may indicate that the UE is located close to a center of a cell, near an edge of a cell, etc. The CQI may also be provided as a portion of the CSI.

For each cell in the geographical area, the method gathers network information that comprises one or more of: radio frequency related statistics, carrier frequency components that are available for the cell, configuration parameters of each base station (e.g., for each eNodeB), Physical Resource Block (PRB) utilization levels for each carrier frequency component, and interference levels. In one embodiment, the configuration parameters comprise one or more of: a list of frequency bands that the base station can operate, the list of operating frequencies within each frequency band, and a list of transmit power levels for each frequency band. The PRB utilization levels and interference levels for a particular cell may be gathered from the base stations associated with the particular cell. The radio frequency related statistics may comprise one or more of: peak data rates, control plane latency, control plane capacity, user plane latency, and user plane throughput.

The method then processes the network information and the user endpoint device information that is gathered on a cell basis. For example, for each particular cell, the method first classifies each UE in a list of UEs associated with the particular cell as: a cell interior UE, a cell edge UE, or an overshooting UE. Then, the method removes UEs that are classified as overshooting UEs from the list of UEs associated with the particular cell. A UE may be classified as a cell interior or a cell edge for the particular cell based on the UE's location relative to the boundary of the particular cell. A UE may be classified as an overshooting UE if the UE is connected to an eNodeB of the particular cell, while the UE is physically closer to an eNodeB covering another cell. The method processes the UE information to remove UEs that are classified as overshooting UEs.

Similarly, for each particular cell, the method processes the network information that is gathered to identify hotspots within the particular cell, and to identify physical resource blocks (PRBs) of each carrier frequency component associated with an interference above a predetermined threshold. The hotspots are areas within the cell that have heavy traffic load. For example, the method may identify a hotspot based on uplink and downlink traffic volumes associated with UEs in the cell, rates, application types, etc. In order to identify the PRBs that have interference above the predetermined threshold, the method uses the levels of interference gathered from eNodeBs. For example, the various PRBs may be associated with various levels of interference. The method then identifies the particular PRBs that have interference above the predetermined threshold.

The method, for each cell, generates a cell specific traffic pattern by correlating the PRBs of each carrier frequency component to locations of UEs within the cell. For example, the interference associated with a PRB may be above the threshold for UEs classified as being cell edge UEs, while the interference for the same PRB may be below the threshold for UEs classified as being cell interior UEs.

The method then determines if there is a need to optimize the network. For example, the method may determine if there is a need to optimize the network based on whether or not the capacity of the network is below a predetermined threshold.

If there is a need to optimize the network, the method then optimizes the network capacity for the entire geographical area based on: the list of UEs and their respective classifications (e.g., as cell interior, cell edge or overshooting), the list of hotspots of each cell that are identified, and the cell specific traffic patterns that are generated. For example, an optimization module that maximizes a network capacity across the geographical area determines, for an optimal capacity level: a frequency reuse factor for each frequency, transmit power levels for each UE (e.g. based on whether the UE is classified as a cell interior or a cell edge UE), particular operating frequencies to be assigned to each cell, and particular carrier frequency components to be assigned to each UE.

The method then continues to monitor the network and continues to gather network and user endpoint device information. The method then determines if there is a need to re-optimize the network. For example, as the network traffic pattern changes over time, the network throughput or network capacity may drift from the desired optimal capacity and throughput. If there is a need to re-optimize, the method then executes the optimization algorithm based on the updated network and user endpoint device information.

In one embodiment, the method performs the maximizing of the network capacity in real-time. In one embodiment, the method performs the maximizing of the network capacity dynamically in an automated manner. For example, when the throughput level drops below a pre-determined threshold, the method may automatically run the optimization algorithm to determine updated frequency reuse factors, updated transmit power levels for each UE, updated operating frequencies for each cell, and updated carrier frequency components to be assigned to each UE.

In one embodiment, the method performs the maximizing of the network capacity when the method is invoked by a user. For example, a network planner may select a region and send a request to maximize the network capacity of the region that is selected. Upon receiving the request, the optimization may then be performed to provide updated frequency reuse factors, updated transmit power levels for each UE, updated operating frequencies for each cell, and updated carrier frequency component assignments to each UE.

In one embodiment, the method of the present disclosure is implemented in a centralized server, e.g., a network element such as an application server deployed within the core network or access network, that utilizes the hybrid ICIC technique to maximize the capacity of the network across an entire selected geographical area. It is important to note that the maximization of the capacity may be performed for one cell. However, due to aggregation of knowledge to enable more efficient sharing of frequencies across the multiple cells, there is more improvement in the total capacity of the network when the maximization is performed for multiple cells.

Figure 2:
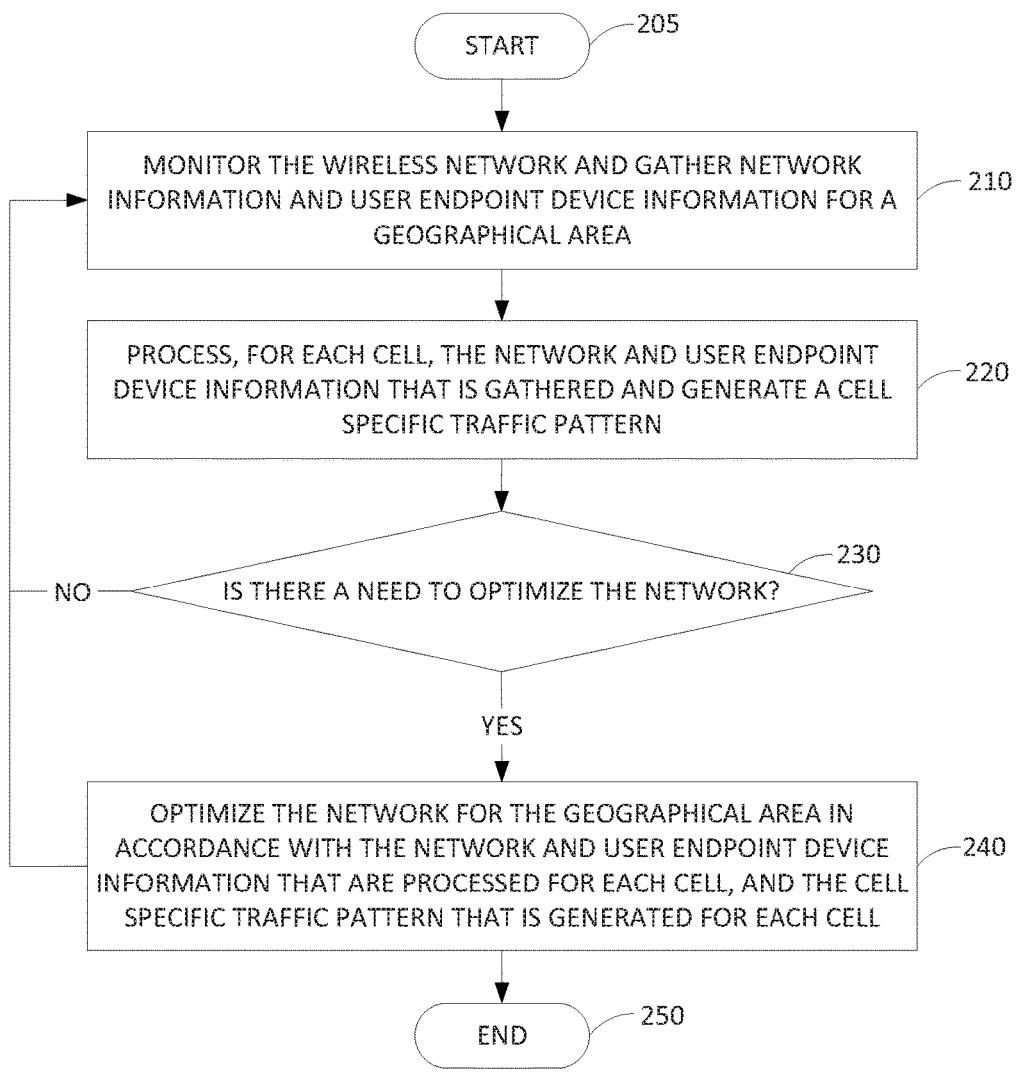
FIG. 2. illustrates a flowchart of a method for maximizing the capacity of a wireless network across a geographical area.

FIG. 2. illustrates a flowchart of a method 200 for maximizing the capacity of a wireless network across a geographical area. In one example, the method may be implemented in a server, e.g., a centralized application server. In another example, the method may be implemented in a controller that controls radio frequency activity for a plurality of cells in the geographical area. In one embodiment, the server may be located in the core network 105. In another embodiment, the server may be located in the wireless access network 101. Method 200 starts in step 205 and proceeds to step 210.

In step 210, method 200 monitors the wireless network and gathers network information and user endpoint device information for a geographical area. For example, for each UE in the geographical area, the method gathers UE information that comprises one or more of: a location of the UE, a Channel State Information (CSI), Channel Quality Information (CQI), and application information. The application accessed by the UE may be a voice application, a data application, a streaming application (e.g., video), etc. The UE may be located close to a center of a cell, near an edge of a cell, etc. For each cell in the geographical area, the method gathers network information that comprises one or more of: radio frequency related statistics, carrier frequency components that are available for the cell, configuration parameters of each base station (e.g. for each eNodeB), Physical Resource Block (PRB) utilization levels for each carrier frequency component, interference levels, etc.

In one embodiment, the configuration parameters comprise one or more of: a list of frequency bands that the base station can operate, the list of operating frequencies within each frequency band, and a list of transmit power levels for each frequency band. The PRB utilization and interference levels may be gathered from the base stations.

In step 220, method 200 processes, for each cell, the network information and the user endpoint device information that is gathered and generates a cell specific traffic pattern. For example, for each particular cell, the method may classify each UE in a list of UEs associated with the particular cell as: a cell interior UE, a cell edge UE, or an overshooting UE. The method may then remove UEs that are classified as overshooting UEs from the list of UEs associated with the particular cell. For each particular cell, the method processes the network information that is gathered to identify hotspots within the particular cell, and to identify physical resource blocks (PRBs) of each carrier frequency component associated with an interference above a predetermined threshold. The method then generates, for each cell, a cell specific traffic pattern by correlating the PRBs of each carrier frequency component to locations of UEs within the cell. For example, the interference associated with a PRB may be above the threshold for UEs classified as being cell edge UEs, while the interference for the same PRB may be below the threshold for UEs classified as being cell interior UEs.

In step 230, method 200 determines if there is a need to optimize the network. For example, the method may determine if there is a need to optimize the network based on whether the capacity of the network is below a predetermined threshold. If there is a need to optimize the network, the method proceeds to step 240. Otherwise, the method either proceeds to step 210, to continue monitoring the network and gathering network and UE information, or to step 250 to end the process.

In step 240, method 200 optimizes the network for the geographical area in accordance with the network information and the user endpoint device information that is processed for each cell, and the cell specific traffic pattern that is generated for each cell. For example, the method optimizes (broadly increases the capacity) for a geographical area of the network based on: the list of UEs and their respective classifications (e.g. as cell interior, cell edge or overshooting), the list of hotspots of each cell that are identified, and the cell specific traffic patterns that are generated. For example, an optimization module that maximizes or increases a network capacity across the geographical area determines, for an optimal capacity level: a frequency reuse factor for each frequency, transmit power levels for each UE (e.g., based on whether the UE is classified as a cell interior or a cell edge UE), particular operating frequencies to be used in each cell, and particular carrier frequency components to be assigned to each UE. Mathematically one can express this optimization as follows; let $f_1^i \ldots f_{n_i}^i$, denote the multiple frequencies where $n_i$ is the number of carrier components assigned to the $i^{th}$ UE. Similarly, the transmit powers and reuse factors for UE $i$ on each of the carrier components is denoted by $P_1^i \ldots P_{n_i}^i$ and $R_1^i \ldots R_{n_i}^i$, respectively. The goal of the optimization module is to determine the optimal parameter values for all UEs in the selected geographical area that would maximize the overall network capacity denoted by C, which is a function of the variables (operation frequency, reuse factors, transmit power levels and carrier components). This can be express as:

$$\operatorname{argmax}_{(n_i, f_{n_i}^i, R_{n_i}^i, P_{n_i}^i)} \sum_{i=1}^{M} C(f_1^i \ldots f_{n_i}^i, R_1^i \ldots R_{n_i}^i, P_1^i \ldots P_{n_i}^i)$$

$$\text{s.t } P_1^i + \ldots P_{n_i}^i = P_T^i$$

where $P_T^i$ is the total power constraint for UE $i$ and $n_i$ is the number of carrier components assigned to the ith UE and M is the total number of UEs from all the cells that are in the selected geographical area. Once the optimal parameter values for all UEs are determined for a selected geographical area, these optimal parameter values are used to optimize the network, e.g., to increase the capability of the selected geographical area of the network.

The method then may provide one or more of: an optimal frequency reuse factor for each frequency, an optimal transmit power level for each user endpoint device, a list of optimal operating frequencies to be used in each cell of the geographical area, and an optimal assignment of a particular carrier frequency component to each user endpoint device accessing the network. The method then proceeds to step 210, to continue monitoring the network and gathering network and UE information, or to step 250 to end the process. For example, as the network traffic pattern changes over time, the network capacity may drift from the desired optimal capacity, thereby needing to execute the optimization operation again.

Figure 3:
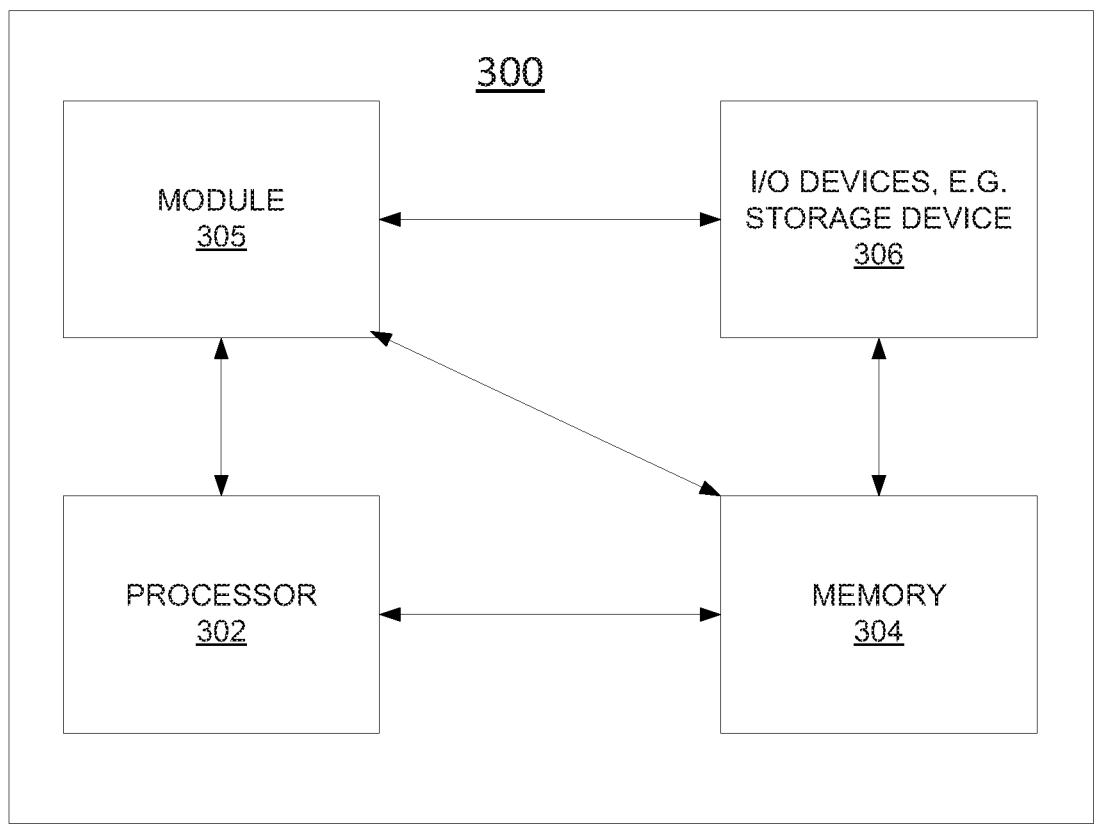
FIG. 3 depicts a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 for maximizing the capacity of a wireless network across a geographical area, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 305 for maximizing the capacity of a wireless network across a geographical area (e.g., a software program comprising computer-executable instructions) can be loaded into memory 304 and executed by hardware processor element 302 to implement the steps, functions or operations as discussed above in connection with the exemplary method 200. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for maximizing the capacity of a wireless network across a geographical area (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for increasing a capacity across a geographical area of a wireless network, the method comprising:
   monitoring, by a processor, the wireless network and gathering network information and user endpoint device information for a geographical area comprising a plurality of cells of the wireless network, wherein the network information comprises physical resource block utilization levels for each carrier frequency component that is available for each cell, wherein the physical resource block utilization levels for each carrier frequency component that is available for a particular cell are gathered from base stations associated with the particular cell;
   processing, for each cell, by the processor, the network information and the user endpoint device information that is gathered and generating a cell specific traffic pattern;
   determining, by the processor, whether the capacity is below a threshold; and
   increasing, by the processor, the capacity of the geographical area in accordance with the network information and the user endpoint device information that is processed for each cell, and the cell specific traffic pattern that is generated for each cell, when the capacity is below the threshold.

2. The method of claim 1, wherein the network information further comprises a list of carrier frequency components that is available for each cell.

3. The method of claim 1, wherein the user endpoint device information comprises one or more of: a location of each user endpoint device, channel state information, channel quality information, and application information.

4. The method of claim 1, wherein the processing the user endpoint device information, for a particular cell, comprises classifying each user endpoint device in a list of user endpoint devices associated with the particular cell as: a cell interior user endpoint device, a cell edge user endpoint device, or an overshooting user endpoint device.

5. The method of claim 4, wherein for the processing the user endpoint device information, for the particular cell, further comprises removing a user endpoint device that is classified as an overshooting user endpoint device from the list of user endpoint devices associated with the particular cell.

6. The method of claim 1, wherein the processing the network information, for a particular cell, comprises identifying a hotspot located within the particular cell.

7. The method of claim 1, wherein the processing the network information, for a particular cell, comprises identifying a physical resource block of a carrier frequency component associated with an interference level above a predetermined threshold.

8. The method of claim 1, wherein the processing the user endpoint device information and the network information, for a particular cell, comprises generating the cell specific traffic pattern by correlating physical resource blocks of each carrier frequency component available for each cell to locations of user endpoint devices associated with the particular cell.

9. The method of claim 1, wherein the increasing the capacity for the geographical area comprises:
   determining an optimal frequency reuse factor for each operating frequency, an optimal transmit power level for each user endpoint device, a list of optimal operating frequencies to be used in each cell of the geographical area, and an optimal assignment of a particular carrier frequency component to each user endpoint device.

10. A computer-readable storage device storing a plurality of instructions which, when executed by a processor, cause the processor to perform operations for increasing a capacity across a geographical area of a wireless network, the operations comprising:
   monitoring the wireless network and gathering network information and user endpoint device information for a geographical area comprising a plurality of cells of the wireless network, wherein the network information comprises physical resource block utilization levels for each carrier frequency component that is available for each cell, wherein the physical resource block utilization levels for each carrier frequency component that is available for a particular cell are gathered from base stations associated with the particular cell;

processing, for each cell, the network information and the user endpoint device information that is gathered and generating a cell specific traffic pattern;

determining whether the capacity is below a threshold; and increasing the capacity of the geographical area in accordance with the network information and the user endpoint device information that is processed for each cell, and the cell specific traffic pattern that is generated for each cell, when the capacity is below the threshold.

11. The computer-readable storage device of claim 10, wherein the network information further comprises a list of carrier frequency components that is available for each cell.

12. The computer-readable storage device of claim 10, wherein the user endpoint device information comprises one or more of: a location of each user endpoint device, channel state information, channel quality information, and application information.

13. The computer-readable storage device of claim 10, wherein the processing the user endpoint device information, for a particular cell, comprises classifying each user endpoint device in a list of user endpoint devices associated with the particular cell as: a cell interior user endpoint device, a cell edge user endpoint device, or an overshooting user endpoint device.

14. The computer-readable storage device of claim 13, wherein for the processing the user endpoint device information, for the particular cell, further comprises removing a user endpoint device that is classified as an overshooting user endpoint device from the list of user endpoint devices associated with the particular cell.

15. The computer-readable storage device of claim 10, wherein the processing the network information, for a particular cell, comprises identifying a hotspot located within the particular cell.

16. An apparatus for increasing a capacity across a geographical area of a wireless network, the apparatus comprising:

a processor; and a computer-readable storage device storing a plurality of instructions which, when executed by the processor, cause the processor to perform operations, the operations comprising:

monitoring the wireless network and gathering network information and user endpoint device information for a geographical area comprising a plurality of cells of the wireless network, wherein the network information comprises physical resource block utilization levels for each carrier frequency component that is available for each cell, wherein the physical resource block utilization levels for each carrier frequency component that is available for a particular cell are gathered from base stations associated with the particular cell;

processing, for each cell, the network information and the user endpoint device information that is gathered and generating a cell specific traffic pattern;

determining whether the capacity is below a threshold; and increasing the capacity of the geographical area in accordance with the network information and the user endpoint device information that is processed for each cell, and the cell specific traffic pattern that is generated for each cell, when the capacity is below the threshold.

17. The apparatus of claim 16, wherein the processing the network information, for a particular cell, comprises identifying a hotspot located within the particular cell.

18. The apparatus of claim 16, wherein the processing the network information, for a particular cell, comprises identifying a physical resource block of a carrier frequency component associated with an interference level above a predetermined threshold.

19. The apparatus of claim 16, wherein the processing the user endpoint device information and the network information, for a particular cell, comprises generating the cell specific traffic pattern by correlating physical resource blocks of each carrier frequency component available for each cell to locations of user endpoint devices associated with the particular cell.

20. The apparatus of claim 16, wherein the increasing the capacity for the geographical area comprises:

determining an optimal frequency reuse factor for each operating frequency, an optimal transmit power level for each user endpoint device, a list of optimal operating frequencies to be used in each cell of the geographical area, and an optimal assignment of a particular carrier frequency component to each user endpoint device.

* * * * *